H. GROB.
DRIVE MECHANISM.
APPLICATION FILED OCT. 7, 1912.
1,107,196.
Patented Aug. 11, 1914.
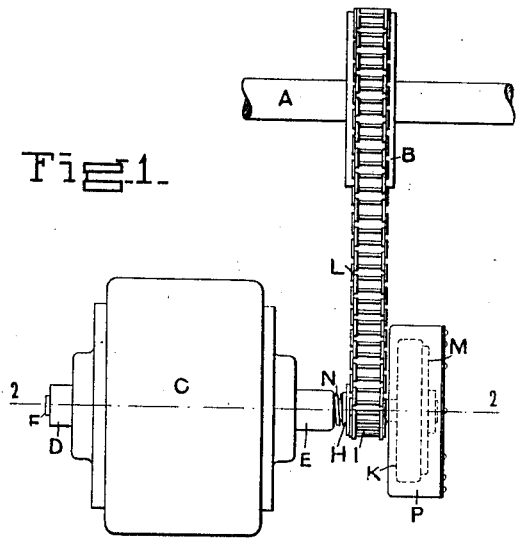
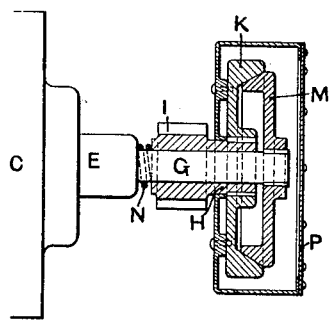
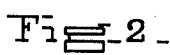
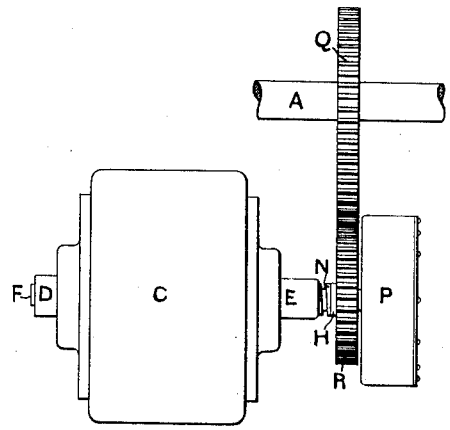
WITNESSES
INVENTOR
H. Grob,
BY
Duell Warfield & Duell
ATTORNEYS
THE NORRIS PETERS CO., PHOTO-LITHO., WASHINGTON, D. C.

UNITED STATES PATENT OFFICE.

HUGO GROB, OF FÜRSTENWALDE, GERMANY.

DRIVE MECHANISM.

1,107,196. Specification of Letters Patent. Patented Aug. 11, 1914.

Application filed October 7, 1912. Serial No. 724,269.

*To all whom it may concern:*

Be it known that I, HUGO GROB, a citizen of the Swiss Confederation, residing at Fürstenwalde, in the Empire of Germany, have invented certain new and useful Improvements in Drive Mechanism, of which the following is a full, clear, and exact description, such as will enable others skilled in the art to which it appertains to make and use the same.

This invention relates to a drive mechanism, and, with regard to the more specific features, to apparatus suitable for driving a train-lighting dynamo from a car axle.

The invention has for one object the provision of a drive mechanism which will be at once efficient, durable and dependable in operation.

Another object of the invention is the provision of means whereby a floating shaft may be used for the driving or driven member.

Another object is the reduction of the stresses involved in the use of a floating shaft.

Another object is the provision of a mechanism wherein the driven member is protected from the harmful effects of sudden variations of speed of the driving member.

Another object of the invention is the provision, in a drive mechanism, of a clutch so located as to be readily accessible for examination, lubrication, repairs or removal, and at the same time so arranged as to be easily protected from oil and other extraneous matter.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the drawings, in which are shown one or more of various possible embodiments of the several features of my invention,—Figure 1 is a plan of my invention as applied to a chain drive for a train lighting dynamo; Fig. 2 is a section along the line 2—2, Fig. 1, with parts removed to show more clearly the interior structure; and Fig. 3 is a plan of a modification.

Similar reference characters refer to similar parts throughout the several views of the drawings.

In Figs. 1 and 2, A designates a portion of a car axle, B a sprocket wheel keyed or otherwise secured thereon, C a dynamo of any approved construction, provided with the bearings D, E to support a shaft F, the shaft F being provided with a floating extension G. As the dynamo suspension forms no part of the present invention, I have not illustrated any mechanism for this purpose. Revolubly mounted on the extension G of the shaft F is a sleeve or collar H provided with a sprocket wheel I and the clutch member K secured thereto. A chain L runs over the sprocket wheels B and I. The outer or floating end of the shaft extension G has connected or otherwise secured thereon a clutch member M adapted to coöperate with the member K. Suitable means, such as a spring N, are provided to keep the sleeve H, and with it the clutch member K, pressed against the clutch member M, so that the clutch will not transmit from the sprocket wheel I to the dynamo shaft F more than a predetermined torque. By having the member I close to the bearing E, the bending stresses in the shaft F and the bearing E, due to the pull of the chain L, are smaller than if the clutch were between said member I and bearing E, and as a result there is usually no necessity of having a third bearing. A further advantage of this arrangement is that the clutch may be examined, cleaned, repaired or removed without disturbing the sprocket wheels, chain or bearings. If desired, the clutch may be protected from any oil used in the chain drive, as by inclosing the clutch in an oil-tight casing, mounted in any convenient manner. Such a casing, mounted so as to revolve with the collar, is shown at P.

In Fig. 3 the sprocket wheels B and I and the chain L are replaced by gear wheels Q, R, the rest of the apparatus being similar to Figs. 1 and 2.

Obviously the invention is applicable whether the apparatus is designed for the driving of a train lighting dynamo or not. For example, in Figs. 1, 2 and 3 the parts may be reversed by having on the shaft F a motor or other source of mechanical power and by making the shaft A the driven element. In fact, the invention is useful in many cases where it is desirable or advantageous to use a drive mechanism embodying one or more of the features stated above as objects of the invention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent is:

1. A drive mechanism for a dynamo comprising a bearing, a dynamo shaft journaled in said bearing and provided with a floating extension, a friction clutch adjacent the outer end of said extension, means between said clutch and said bearing adapted to be rotated by power from an external source, and means comprising said clutch adapted to drive said shaft from said first means.

2. A drive mechanism comprising a shaft with a floating extension, a collar on said extension, coacting clutch members connecting respectively with said collar and said extension, means adapted to cause the coaction of said clutch members, a second shaft, and means for transmitting power between said second shaft and said collar.

3. A drive mechanism comprising a shaft with a floating extension, a collar on said extension, a clutch adapted to cause the engagement of said collar and said extension, a second shaft, and means for transmitting power between said second shaft and said collar.

4. A drive mechanism comprising a shaft with a floating extension, a collar on said extension, a clutch adapted to maintain a yielding engagement between said collar and said extension, a second shaft, and means for transmitting power between said second shaft and said collar.

5. A drive mechanism comprising a shaft with a floating extension, a collar on said extension, coacting clutch members connected respectively with said collar and said extension, means adapted to cause the coaction of said clutch members, a second shaft, and means for transmitting power between said second shaft and the portion of the collar farthest from the outer end of said extension.

6. A drive mechanism comprising a shaft with a floating extension, a collar on said extension, a clutch adapted to cause the engagement of said collar and said extension, a second shaft, and means for transmitting power between said second shaft and the portion of the collar farthest from the outer end of said extension.

7. A drive mechanism comprising a shaft with a floating extension, a collar on said extension, a clutch adjacent the outer end of the extension adapted to cause the engagement of said collar and said extension, a second shaft, and means for transmitting power between said second shaft and said collar.

8. A drive mechanism comprising a shaft with a floating extension, a collar on said extension, a clutch adjacent the outer end of the extension adapted to maintain a yielding engagement between said collar and said extension, a second shaft, and means for transmitting power between said second shaft and said collar.

9. A drive mechanism comprising a shaft with a floating extension, a collar on said extension, a clutch adjacent the outer end of the extension adapted to cause the engagement of said collar and said extension, a second shaft, and means for transmitting power between said second shaft and the portion of the collar farthest from the outer end of the extension.

10. A drive mechanism comprising a shaft with a floating extension, a collar on said extension, a clutch adjacent the outer end of the extension adapted to maintain a yielding engagement between said collar and said extension, a second shaft, and means for transmitting power between said second shaft and the portion of the collar farthest from the outer end of the extension.

11. A drive mechanism comprising a shaft with a floating extension, a collar on said extension, a clutch adjacent the outer end of the extension adapted to cause the engagement of said collar and said extension, and means inclosing the clutch.

12. A drive mechanism comprising a driving and a driven shaft, one of said shafts being provided with a bearing and a floating extension beyond said bearing, a clutch member secured adjacent the end of said extension, a collar on said extension between said bearing and said clutch member, a second clutch member secured on said collar, means tending to keep said clutch members in yielding engagement, and means for transmitting power between said collar and the other shaft.

13. A drive mechanism comprising a car axle, a dynamo shaft with a floating extension, a clutch member adjacent the outer end of said extension and secured to said extension, a collar on the portion of said extension farthest from said outer end, a clutch member on said collar, means for maintaining said clutch members in yielding engagement, and means for transmitting power between said collar and said axle.

14. A drive mechanism comprising a car axle, a dynamo shaft with a floating extension, a friction clutch member adjacent the outer end of said extension and secured to said extension, a collar on the portion of said extension farthest from said outer end, a friction clutch member on said collar, means for maintaining said clutch members in yielding engagement, and means for transmitting power between said collar and said axle.

15. A drive mechanism comprising a car axle, a dynamo shaft with a floating extension, a clutch member adjacent the outer end of said extension and secured to said extension, a collar on the portion of said extension farthest from said outer end, a clutch member on said collar, means for maintaining said clutch members in yielding engagement, and means comprising a chain and sprocket wheels for transmitting power between said collar and said axle.

16. A drive mechanism comprising a car axle provided with a sprocket wheel, a dynamo shaft with a floating extension, a collar on the portion of said extension farthest from the outer end thereof, a sprocket wheel on said collar, a friction clutch adjacent the outer end of said collar and extension and connected to said collar and extension, and a chain adapted to connect said sprocket wheels.

In testimony whereof I affix my signature, in the presence of two witnesses.

HUGO GROB.

Witnesses:
H. WATSON,
DELOS G. HAYNES.

Copies of this patent may be obtained for five cents each, by addressing the "Commissioner of Patents, Washington, D. C."